March 12, 1968  F. P. SULLIVAN  3,373,300
ELECTRIC BEARING FAILURE INDICATOR
Filed Feb. 4, 1966

INVENTOR.
FRANCIS P. SULLIVAN
BY *James M. Nickels*

ATTORNEY

March 12, 1968 F. P. SULLIVAN 3,373,300
ELECTRIC BEARING FAILURE INDICATOR
Filed Feb. 4, 1966 2 Sheets-Sheet 2

INVENTOR.
FRANCIS P. SULLIVAN
BY
ATTORNEY

United States Patent Office 3,373,300
Patented Mar. 12, 1968

---

3,373,300
ELECTRIC BEARING FAILURE INDICATOR
Francis P. Sullivan, 97 Mountain Ave.,
Bloomfield, N.J. 07003
Filed Feb. 4, 1966, Ser. No. 525,034
5 Claims. (Cl. 310—68)

The present invention relates to dynamoelectric machines and more particularly to means for indicating bearing failure in such machines.

It is desirable to have some indication of bearing failure in an alternating current generator in order to protect the generator, the engine gear box or the constant speed drive to which the generator is attached. Normally in the failure of the bearing, the balls and/or races wear to an extent that the rotor drops down until finally it rubs on the stator, thus creating friction, which generates heat, and eventually causing a fire, destroying the generator and also the possibility of the rotor seizing with damage to the driving source.

The present invention provides a warning system actuated by the change in the air gap between the rotor and stator. Under the conditions of a deteriorating bearing, the air gap increases at the top of the machine and decreases at the bottom. This effect is not readily apparent external to the machine, which will continue to operate at its normal excitation in an unchanged manner. A conducting coil placed in the stator slots either at the top or bottom of the generator will see the effects of the air gap change by the change in induced voltage in the coil. In the coil at the top of the generator, the increased air gap will cause a decrease in the flux cutting the coil, thereby causing the induced voltage to decrease. Conversely, the decrease in the air gap at the bottom of the generator will cause the flux to increase and the induced voltage in a coil at the bottom of the generator to increase. The differences in these voltages is utilized to provide a signal to indicate impending bearing failure.

It is an object of the invention to provide novel means for indicating bearing failure.

Another object of the invention is to provide novel means to indicate impending bearing failure in an A.C. generator.

The above and other objects and features of the invention will appear more fully hereinafter from a consideration of the following description taken in connection with the accompanying drawings wherein two examples are illustrated by way of examples:

Figure 1:
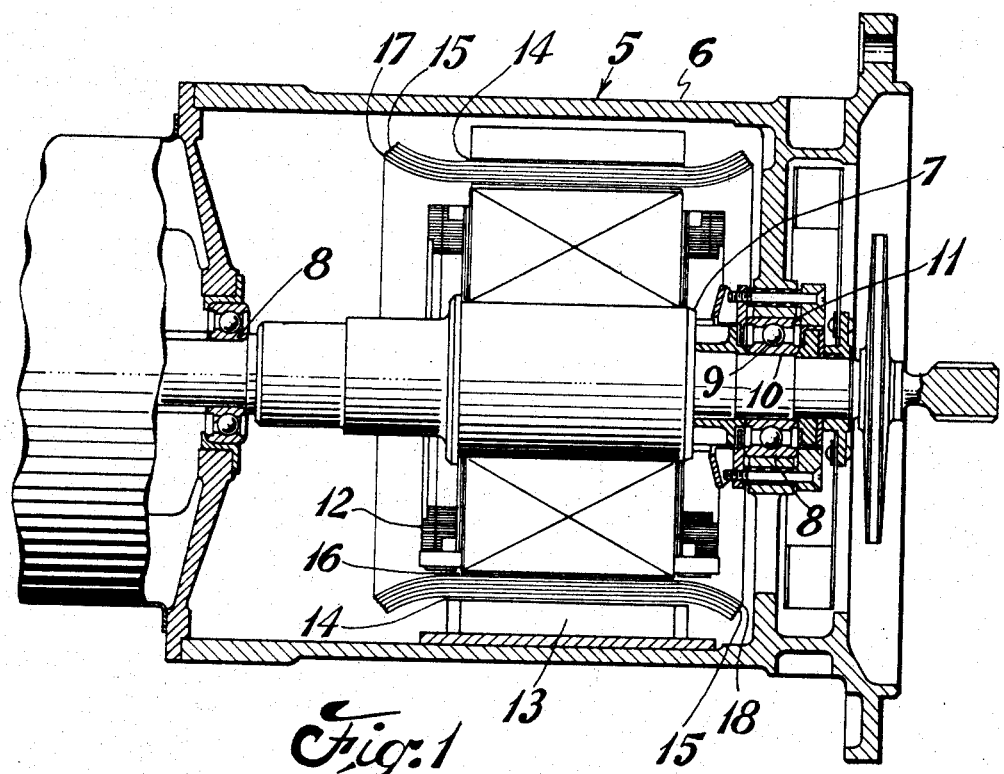
FIGURE 1 is a sectional view of an A.C. generator embodying the invention.
Figure 2:
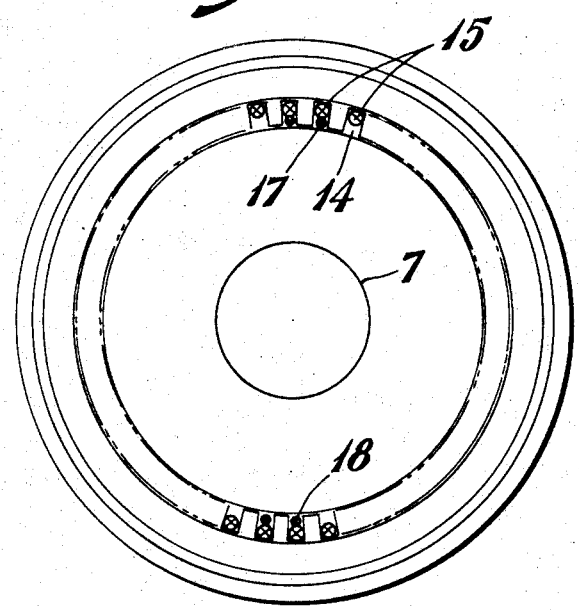
FIGURE 2 is a sectional view of the generator in FIGURE 1 taken along the lines 2—2.

Referring now to FIGURES 1 and 2 of the drawing, an A.C. generator is indicated generally by the numeral 5. While a brushless type is illustrated, it is understood that other types could also be used. The generator has a housing 6 in which a rotor 7 is mounted for rotation by bearing 8. The bearings 8 include balls 9, inner race 10 and outer race 11. The rotor 7 has a rotor winding 12. Also mounted in the housing 6 is a stator 13 having a plurality of slots 14 spaced around the inner perimeter thereof and having stator windings 15 secured therein. A predetermined air gap 16 separates the stator from the rotor.

Figure 3:
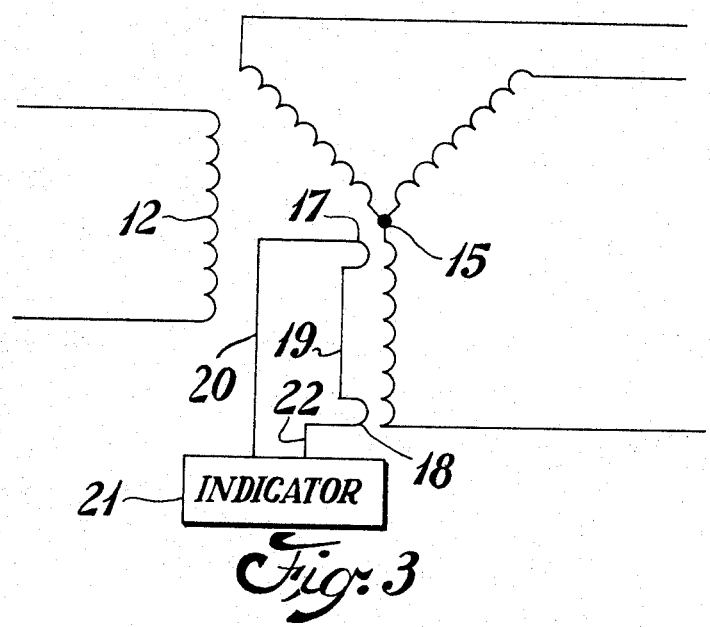
FIGURE 3 is a schematic diagram illustrating one embodiment of the invention.

A novel feature of the invention is the provision of coils 17 and 18 (see FIGURES 2 and 3), 180 degrees apart in slots 14 of the stator 13. The coil 17 is located at the top of the generator 6 and the coil 18 is located at the bottom of the generator. One side of the coil 17 is connected by a conductor 19 to one side of the coil 18. The other side of the coil 17 is connected by a conductor 20 to one input terminal of an indicator 21. The other side of the coil 18 is connected by conductor 22 to the other input terminal of the indicator 22. The indicator may be any suitable type such as, for example, a meter, light, relay, bell, or switch. It is understood that the invention is not limited to a specific type of indicator.

In operation, normally the coils 17 and 18 would have a voltage induced therein approximately in phase with each other. By connecting the coils 17 and 18 in series so that their voltages oppose each other, there will be no voltage across the series combination when the air gaps are symmetrical. Upon wearing of one or both bearings, the air gap will be increased between the rotor 7 and the coil 17 and decreased between the rotor 7 and the coil 18. Upon this condition occurring, the voltage of the coil 17 will decrease and that of the coil 18 will increase. This difference in voltage will appear across the series combination and is used to actuate the indicator to warn of an impending bearing failure.

Figure 4:
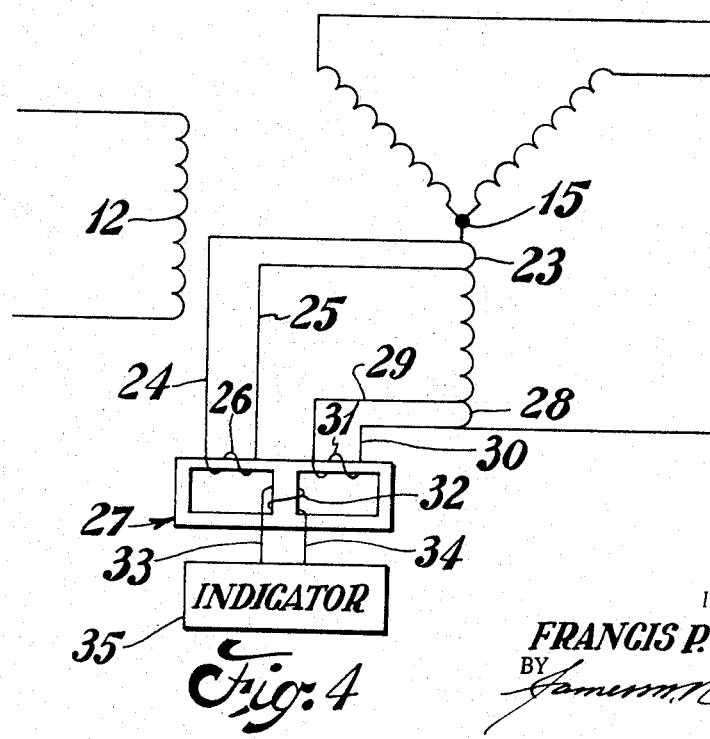
FIGURE 4 is a schematic diagram illustrating another embodiment of the invention.

Referring now to FIGURE 4, instead of adding separate coils, stator windings of the same phase are tapped 180° apart. A coil 23 at the top of the generator 5 has taps 24 and 25 which are connected to a winding 26 on an isolating potential transformer 27. Another coil 28 at the bottom of the generator has taps 29 and 30 connected to another winding 31 on the transformer 27. The transformer 27 has an output winding 32 which is connected by conductors 33 and 34 to an indicator 35.

In operation with the air gap equal between the coils 23 and 28 the voltages in the windings 26 and 31 of the transformer 27 will be equal and opposing and will produce canceling flux in the transformer 27. Upon the air gaps changing, the voltages produced in the coils 23 and 28 will be different which will cause a total net flux to flow in the transformer 27 causing a voltage to be induced in the winding 32. This voltage will actuate the indicator, thus giving a warning of impending bearing failure.

Another condition that sometimes occurs when bearings are worn is that the rotor will bounce. This condition can also be detected by either of the arrangements set forth heretofore. Upon the rotor bouncing, a modulation will be set up in the sensing coils which can be picked up by the detectors.

Although only two embodiments of the invention have been illustrated and described, various changes in the form and relative arrangements of the parts, which will now appear to those skilled in the art, may be made without departing from the scope of the invention.

What is claimed is:

1. A bearing failure indicator for an A.C. generator having a housing, a stator mounted in said housing and a rotor mounted by bearings in said housing and having a predetermined air gap between said stator and rotor, the improvement comprising a pair of windings located 180° apart in slots in said stator, an indicator, circuit means connecting said windings in phase opposition in series with said indicator, said winding being responsive to unsymmetrical changes in said air gap to actuate said indicator.

2. The combination as set forth in claim 1 in which said pair of windings are located at the top and bottom respectively of said stator.

3. The combination as set forth in claim 1 in which said pair of windings each encircle one tooth between slots.

4. The combination as set forth in claim 1 in which said pair of windings are formed by tapping windings of the same phase on said stator 180 degrees apart.

5. The combination as set forth in claim 1 in which an isolating potential transformer is connected between said windings and said indicator.

References Cited

UNITED STATES PATENTS

| | | | |
|---|---|---|---|
| 2,794,136 | 5/1957 | Kalikow | 310—68 |
| 2,619,573 | 11/1952 | Dawson | 310—68 |
| 1,492,022 | 4/1924 | Eddy | 310—68 |

FOREIGN PATENTS

| | | |
|---|---|---|
| 620,198 | 4/1927 | France. |

MILTON O. HIRSHFIELD, *Primary Examiner.*

J. D. MILLER, *Assistant Examiner.*